United States Patent Office 3,546,931
Patented Dec. 15, 1970

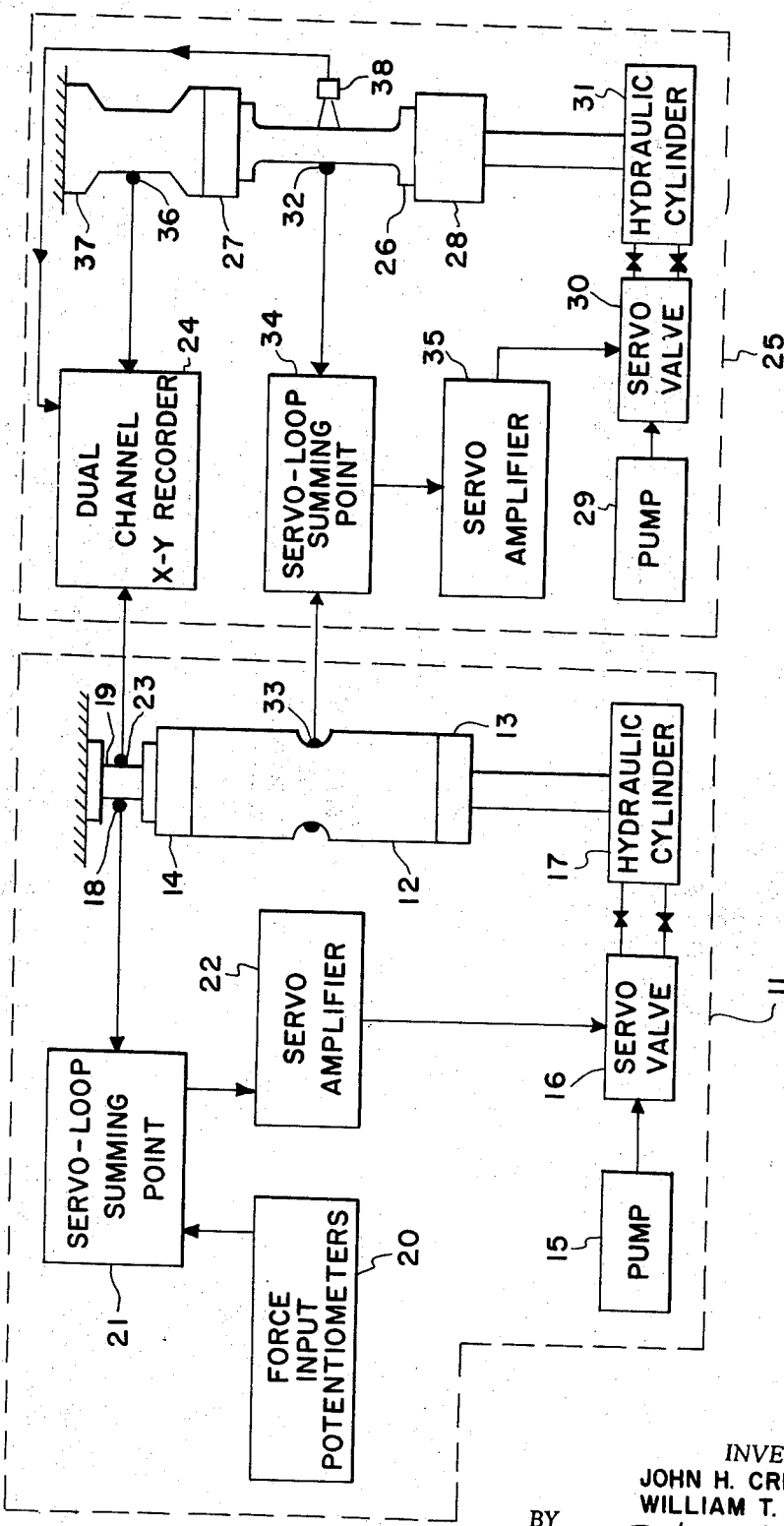

3,546,931
STRAIN-COUPLED SERVO-CONTROL SYSTEM
John H. Crews, Jr., Newport News, and William T. Davis, Yorktown, Va., assignors to the United States of America as represented by the Administrator of the National Aeronautics and Space Administration
Filed Mar. 19, 1969, Ser. No. 808,577
Int. Cl. G01c 5/30; G01n 3/10
U.S. Cl. 73—90                    5 Claims

ABSTRACT OF THE DISCLOSURE

A system for measuring the local stresses in a material at a geometric discontinuity that are caused by stresses applied to the material. A first servo system applies stresses to a first material specimen with a geometric discontinuity therein. A second servo system applies stresses to a second material specimen to produce strains in the second specimen that are equal to the strains produced at the geometric discontinuity of the first specimen. The strains produced in the second specimen are interpreted as the local stresses at the geometric discontinuity.

The invention described herein was made by an employee of the United States Government and may be manufactured and used by or for the Government for governmental purposes without the payment of any royalties thereon or therefor.

The invention relates generally to a system for measuring stresses, and more specifically concerns a system for measuring the local stresses at a geometric discontinuity in a material.

Oftentimes fatigue failures in structural material originate at geometric discontinuities in the material. The reason for this is the applied stresses to the material produce local stresses at these geometric discontinuities that are higher than the applied stresses. As a result, a better understanding of structural fatigue results from the knowledge of the local stress behavior at geometric discontinuities in the structure.

In weight critical structures, these local stresses are often in the plastic range. This, along with their cyclic nature, prohibitively complicates analytical approaches to the study of local stress behavior. Consequently, experimental studies are required. To simplify this experimental approach, sheet specimens containing edge notches have been studied with attention restricted to the notch roots.

Unfortunately, direct evaluation of the cyclic elastoplastic stress behavior at a notch root is beyond the state of the art of experimental stress analysis. Consequently, a method has been developed in which local stresses are found by measuring the elastoplastic strains at a notch root and then reproducing the strain history in an unnotched companion specimen of the same material. The loads required to produce the strain history in the companion specimen are interpretable as stress history at the notch root.

A major difficulty, however, lies in reproducing the actual strain history; that is, the strain and strain rates, in the companion specimen. While useful stress results have been obtained by reproducing only the strains sequence, errors due to strain-rate effects and creep are possible.

Previous applications of the companion specimen method reproduced strains with little control of time effects. Hence, strain-rates and creep effects created errors in stress results when the strain was reproduced in the companion specimen at an arbitrary rate. Also, the two tests were conducted separately, thus requiring considerable time.

It is therefore an object of this invention to synchronize tests of the notched and companion specimen in the companion specimen method of measuring local stresses to eliminate unwanted time effects.

Another object of this invention is to reduce the total time required to conduct the tests in the companion specimen method.

Other objects and advantages of this invention will become apparent hereinafter and in the drawing in which the sole figure is a block diagram of this invention.

Turning now to the embodiment of the invention selected for illustration, the number 11 in the figure designates a closed loop servo system for cyclically loading a notched specimen 12 of the material that is tested. Notched specimen 12 is supported by specimen grips 13 and 14 and stresses are applied to the specimen by means of a pump 15, a servo valve 16 and a hydraulic cylinder 17. A strain gage 18 is attached to a weight bar 19 for the purpose of producing an electrical signal indicative of the stress applied to the notched specimen 12. Force input potentiometers 20 produce electrical signals which are combined with the signals produced by strain gage 18 at a servo-loop summing point 21 to produce a difference signal which is applied through servo amplifier 22 to servo valve 16 to control it. Hence, as is well known in the art, the stress which is applied to notch specimen 12 is controlled by the force input potentiometers 20. Another strain gage 23 is attached to weight bar 19 to produce electrical signals indicative of the stresses applied to the notched specimen 12. These signals are recorded on a dual channel X-Y recorder 24. Thus, the history of the stresses applied to notch specimen 12 is recorded on recorder 24.

A servo system 25 provides means for producing the same strain history in a companion specimen 26 as that produced in the notch of specimen 12. Companion specimen 26 is made from the same material as notch specimen 12. Companion specimen 26 is held by specimen grips 27 and 28, and stresses are applied to this specimen by means of a pump 29, a servo valve 30 and a hydraulic cylinder 31. A strain gage 32 is attached to specimen 26 to produce electrical signals indicative of the strains produced in specimen 26, and a strain gage 33 is attached to specimen 12 at its notch to produce electrical signals indicative of the strains produced at this notch. The signals produced by strain gages 32 and 33 are combined at a servo-loop summing point 34 to produce a difference signal which is applied through a servo amplifier 35 to servo valve 30. Thus, the strain history of the notch of specimen 12 is exactly reproduced in specimen 26. A strain gage 36 is attached to weight bar 37 to produce signals indicative of the strains in this weight bar. These signals are recorded on recorder 24. An extensometer 38 is attached to companion specimen 26 to produce electrical signals indicative of the strains produced in specimen 26. These signals are also recorded on recorder 24.

Through the closed loop mode of operation of system 25, the strain in companion specimen 26 is maintained at the same strain level as the notch root of specimen 12. The loading rate (straining rate) capability of the companion specimen machine is higher than that of the notched specimen machine, thus allowing the companion specimen to follow the notch root behavior on both the strain and strain rate basis, as the notch specimen is loaded cyclically.

In the operation of this invention a notched specimen 12 of the material to be tested is placed in the servo system 11 and a load program is applied to the specimen by means of force input potentiometers 20. This load program is recorded on dual channel X–Y recorder 24 from the signals produced by strain gage 23. The resulting strain history produced at the notch of specimen 12 is exactly reproduced in the companion specimen 26 by the servo system 25. This strain history in specimen 26 is recorded on recorder 24 from signals produced by the extensometer 38. The loads required to produce the strain history in the companion specimen 26 are interpretable as stress history at the notch root in specimen 12.

The advantages of this invention are that it allows the companion specimen method to be perfectly synchronized, thus eliminating errors in the previous method resulting from strain-rate effects and minimizing errors due to creep and stress relaxation. In addition, since the notched and companion specimens are tested simultaneously, this invention inherently decreases testing time to approximately one-sixth that required by the previous method.

What is claimed is:

1. A system for measuring the local stresses in a material at a geometric discontinuity that are caused by stresses applied to the material comprising:
  a first specimen of said material with a geometric discontinuity contained therein;
  a first servo system for applying stresses to said first specimen; means for sensing the strain deformation at said geometric discontinuity and producing a signal indicative of said strain;
  a second specimen of said material;
  means including a second servo system responsive to said signal for introducing strains in said second specimen equal to the strains produced at said geometric discontinuity; and
  means for recording the stresses applied to said first and second specimen whereby the stresses applied to said second specimen are interpretable as stress at said geometric discontinuity resulting from the stresses applied to said first specimen.

2. In a system for measuring the local stresses in a material at a geometric discontinuity that are caused by stresses applied to the material comprising:
  a first specimen of said material with a geometric discontinuity contained therein;
  means for applying stresses to said first specimen;
  means for sensing the strain deformation at said discontinuity and producing first electrical signals indicative of the strains produced at said geometric discontinuity by said applied stresses;
  a second specimen of said material;
  means for producing second electrical signals indicative of the strains produced in said second specimen by the stresses applied to it; and
  means for combining said first and second electrical signals to form difference electrical signals; means responsive to said difference signals for applying stresses to said second specimen whereby the strain history of said first specimen at said geometric discontinuity is reproduced in said second specimen.

3. In a system according to claim 2 wherein said first specimen is a notched specimen of said material and said second specimen is an unnotched specimen of said material.

4. In a system according to claim 2 wherein said means for producing said first and second electrical signals are strain gages.

5. In a system according to claim 2 including means for producing third electrical signals indicative of the stresses applied to said first specimen;
  means for producing fourth electrical signals indicative of the stresses applied to said second specimen; and
  means for recording said third and fourth electrical signals whereby said fourth signals are interpretable as stresses at said geometric discontinuity resulting from the stresses applied to said first specimen as represented by said third signals.

References Cited

Hydraulic Tension-Compression Fatigue Machine, Pelloux et al., Review of Scientific Instruments, vol. 35, No. 11, November 1964, pp. 1564–1566.

RICHARD C. QUEISSER, Primary Examiner

J. WHALEN, Assistant Examiner

U.S. Cl. X.R.

73—89, 97